United States Patent
Andrews

(10) Patent No.: US 9,674,043 B2
(45) Date of Patent: Jun. 6, 2017

(54) SYSTEMS AND METHODS FOR AUTOMATICALLY CLUSTERING DEVICES

(71) Applicant: SCHNEIDER ELECTRIC IT CORPORATION, West Kingston, RI (US)

(72) Inventor: Bibin Andrews, Ladakh (IN)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 286 days.

(21) Appl. No.: 14/331,051

(22) Filed: Jul. 14, 2014

(65) Prior Publication Data
US 2016/0013988 A1    Jan. 14, 2016

(51) Int. Cl.
*H04L 12/24* (2006.01)
*H04L 29/08* (2006.01)

(52) U.S. Cl.
CPC ............ *H04L 41/12* (2013.01); *H04L 41/044* (2013.01); *H04L 67/12* (2013.01)

(58) Field of Classification Search
CPC .... H04L 1/1621–1/1628; H04L 9/0866; H04L 29/12122; H04L 41/12; H04L 67/16
USPC .......................................................... 709/223
See application file for complete search history.

(56) References Cited

U.S. PATENT DOCUMENTS

| | | | | |
|---|---|---|---|---|
| 7,323,991 B1* | 1/2008 | Eckert | ................ | G07C 9/00111 235/382 |
| 8,402,120 B1* | 3/2013 | Perkinson | ............... | H04L 67/16 370/254 |
| 8,799,443 B2* | 8/2014 | Schmidt | ................ | H04L 61/103 709/203 |
| 9,265,077 B2* | 2/2016 | Cheng | ................... | H04W 76/02 |
| 2002/0047774 A1* | 4/2002 | Christensen | ........... | G05B 15/02 340/3.54 |
| 2008/0040479 A1* | 2/2008 | Bridge | ...................... | B60L 3/12 709/224 |
| 2008/0238436 A1* | 10/2008 | Bickel | ...................... | H02H 3/14 324/509 |
| 2009/0066528 A1* | 3/2009 | Bickel | .................... | G01D 4/004 340/657 |
| 2009/0195349 A1* | 8/2009 | Frader-Thompson | . | G01D 4/002 340/3.1 |
| 2010/0256828 A1* | 10/2010 | Wang | .................... | G06Q 50/06 700/286 |
| 2010/0306151 A1* | 12/2010 | Bickel | .................... | G01D 4/002 706/46 |
| 2012/0000975 A1* | 1/2012 | Heath | .................. | G06Q 10/087 235/375 |

(Continued)

*Primary Examiner* — Douglas Blair
(74) *Attorney, Agent, or Firm* — Lando & Anastasi, LLP

(57) ABSTRACT

A system including a parent device is provided. The parent device includes a power output configured to provide output power to an external device, a first network interface configured to exchange data with at least one external device, and at least one controller coupled to the power output and the first network interface. The controller is configured to determine an identifier of the parent device, transmit an identification message to a child device via the power output, the identification message including the identifier of the parent device, and receive a response to the identification message via the first network interface, the response including an identifier of the child device.

17 Claims, 7 Drawing Sheets

(56) References Cited

U.S. PATENT DOCUMENTS

| | | | |
|---|---|---|---|
| 2012/0198101 A1* | 8/2012 | Porcella | G06F 13/4081 |
| | | | 710/12 |
| 2012/0239744 A1* | 9/2012 | Yonge, III | H04L 12/4633 |
| | | | 709/204 |
| 2012/0239929 A1* | 9/2012 | Newman | H04L 63/06 |
| | | | 713/168 |
| 2013/0250810 A1* | 9/2013 | Ho | H04L 41/12 |
| | | | 370/255 |
| 2014/0169222 A1* | 6/2014 | Cohen | H04W 84/22 |
| | | | 370/255 |
| 2014/0359018 A1* | 12/2014 | Sun | G05B 15/02 |
| | | | 709/204 |
| 2015/0264731 A1* | 9/2015 | Lin | H04L 67/26 |
| | | | 455/41.2 |

\* cited by examiner

SYSTEMS AND METHODS FOR AUTOMATICALLY CLUSTERING DEVICES

BACKGROUND

Technical Field

The technical field relates generally to management of programmable devices and, more particularly, to automatically clustering devices having some common characteristic.

Discussion

Many programmable devices may be used within a home, building, industry, or IT infrastructure. These programmable devices may be interconnected and exchange data with one another. Each programmable device may include a user interface to monitor, manage, and maintain the programmable device. Interconnected programmable devices may utilize a variety of communication protocols, such as CAN, MODBUS, Ethernet, etc. to exchange (i.e., transmit or receive) data and perform other functions. Identifying relationships between installed programmable devices often involves substantial manual effort.

SUMMARY

According to at least one embodiment, a computer implemented method for automatically clustering programmable devices is provided. The method may be executed by a programmable device including memory and at least one processor coupled to and in data communication with the memory. The method includes acts of determining an identifier of a parent device, transmitting an identification message to a child device via a power output, the identification message including the identifier of the parent device, and receiving a response to the identification message via a first network interface, the response including an identifier of the child device.

In the method, the act of determining the identifier of the parent device may include an act of receiving input indicating the identifier of the parent device. The act of transmitting the identification message may include an act of transmitting the identification message to the child device via a power output electrically coupled to the child device to provide power to the child device. The act of receiving the response may include an act of receiving the response to the identification message via the first network interface communicatively coupled to the child device to receive data from the child device using a communication protocol comprising at least one of CAN, MODBUS, and Ethernet.

The method may further include acts of determining the identifier of the child device, receiving the identification message via a power input of the child device, and transmitting the response via a second network interface of the child device. The method may further include acts of updating a parent device table with the identifier of the parent device and the identifier of the child device and transmitting a first table update message to the child device, the first table update message comprising the identifier of the parent device and the identifier of the child device. The method may further include acts of receiving the first table update message at the child device, updating a child device table with the identifier of the parent device and the identifier of the child device, and transmitting a second table update message to another child device, the second table update message comprising the identifier of the parent device and the identifier of the child device.

According to another embodiment, a system including a parent device is provided. The parent device includes a power output configured to provide output power to an external device, a first network interface configured to exchange data with at least one external device, and at least one controller coupled to the power output and the first network interface. The controller is configured to determine an identifier of the parent device, transmit an identification message to a child device via the power output, the identification message including the identifier of the parent device, and receive a response to the identification message via the first network interface, the response including an identifier of the child device.

The system may further include a graphical user interface coupled to the at least one controller and configured to receive input indicating the identifier of the parent device.

In the system, the at least one controller may be further configured to update a parent device table with the identifier of the parent device and the identifier of the child device and transmit a first table update message to the child device, the first table update message including the identifier of the parent device and the identifier of the child device.

The system may further include the child device. The child device may include a power input configured to receive power, a second network interface configured to exchange data with one or more external devices, and one or more controllers coupled to the power input and the second network interface. The one or more controllers may be configured to determine an identifier of the child device, receive the identification message via the power input, and transmit the response via the second network interface.

In the system, the one or more controllers of the child device may be further configured to receive the first table update message, update a child device table with the identifier of the parent device and the identifier of the child device, and transmit a second table update message to another child device, the second table update message comprising the identifier of the parent device and the identifier of the child device. The power output may be electrically coupled to the child device to provide power to the child device. The first network interface may be communicatively coupled to the child device to receive data from the child device using a communication protocol comprising at least one of CAN, MODBUS, and Ethernet.

According to another embodiment, a system including a child device is provided. The child device includes a power input configured to receive power, a first network interface configured to exchange data with at least one external device, and at least one controller coupled to the power input and the first network interface. The at least one controller is configured to determine an identifier of the child device, receive an identification message from a parent device via the power input, the identification message including the identifier of the parent device, and transmit a response to the identification message via the first network interface, the response including an identifier of the child device.

The system may further include a graphical user interface coupled to the at least one controller and configured to receive input indicating the identifier of the child device.

In the system, the at least one controller may be further configured to receive a first table update message from the parent device, the first table update message including the identifier of the child device and the identifier of the parent device, update a child device table with the identifier of the child device and the identifier of the parent device, and transmit a second table update message to another child device, the second table update message comprising the identifier of the parent device and the identifier of the child device.

The system may further include the parent device. The parent device may include a power output configured to provide output power to an external device, a second network interface configured to exchange data with one or more external devices, and one or more controllers coupled to the power output and the second network interface. The one or more controllers may be configured to determine an identifier of the parent device, transmit the identification message via the power output, and receive the response via the second network interface. The one or more controllers of the parent device may be further configured to update a parent device table with the identifier of the parent device and the identifier of the child device and transmit the first table update message. The power input may be electrically coupled to the parent device to receive power from the parent device.

According to another embodiment, a power device is provided. The power device includes a power input configured to receive input power from a power source, a power output configured to provide output power to a load, a network interface configured to exchange data with at least one external device, and at least one controller coupled to the power input, the power output, and the network interface. The at least one controller is configured to determine an identifier of the power device, transmit a first identification message to a child device via the power output, the identification message including the identifier of the power device, receive a first response to the first identification message via the network interface, the first response including an identifier of the child device, receive a second identification message from a parent device via the power input, the second identification message including an identifier of the parent device, and transmit a second response to the second identification message via the network interface, the second response including the identifier of the power device.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

As least some embodiments disclosed herein are directed to systems and processes that automatically cluster programmable devices based on a power connection hierarchy, thereby providing an easy and efficient way to monitor, manage, and maintain the programmable devices. This power connection hierarchy may include one or more power paths. Each power path may include one or more power providers and one or more power consumers. A power provider may generate or receive power and distribute power to other programmable devices. A power consumer may receive and use power to execute some function. Each distinct programmable device within a power path may be a power provider, a power consumer, or both a power provider and a power consumer. Examples of power consumers include computer systems, power distribution units (PDUs), and UPSs. Examples of power providers include generators, power cables, power panels, PDUs, UPSs, outlets, and plugs.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Automatic Clustering System

Figure 1:
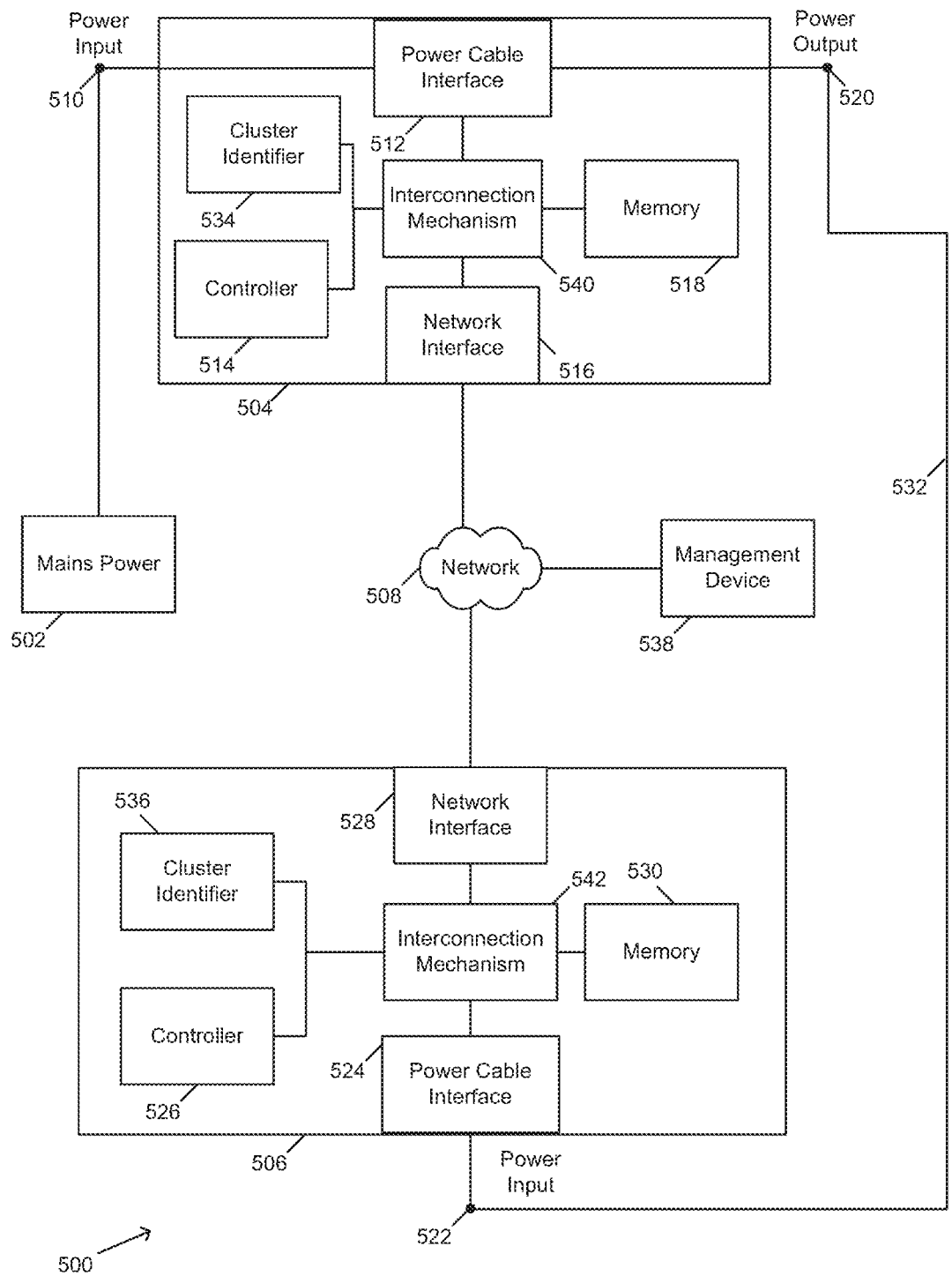
FIG. 1 is a block diagram of an automatic clustering system.

Various embodiments disclosed herein automatically cluster one or more programmable devices along one or more power paths based on power connections and power distribution relationships between the programmable devices. FIG. 1 illustrates one of these embodiments, an automatic clustering system 500. As illustrated in FIG. 1, the automatic clustering system 500 includes programmable devices 504 and 506, a communications network 508, a power cable 532, and a management device 538. The management device 538 may include one or more computer systems, such as the computer system described below with reference to FIG. 2. The programmable device 504 includes a power input 510 for coupling to a utility or mains power source 502, a power cable interface 512, a controller 514, a network interface 516, a memory 518, a power output 520, a cluster identifier 534, and an interconnection mechanism 542. The programmable device 506 includes a power input 522, a power cable interface 524, a controller 526, a network interface 528, a memory 530, a cluster identifier 536, and an interconnection mechanism 544. The power cable 532 may include either physical electrical cabling or wireless power transfer mechanisms, such as via inductive coupling. In addition, both of the programmable devices 504 and 506 may house one or more of the components listed above within a housing.

As depicted in FIG. 1, the programmable devices 504 and 506 and the management device 538 are coupled to and communicate information via the network 508. More specifically, the programmable devices 504 and 506 are coupled to and communicate data with the network 508 via the network interfaces 516 and 528. The network 508 may include any communication channel or network through which devices may communicate information. For example, the network 508 may be a public network, such as the internet, and may include other public or private networks such as LANs, WANs, extranets, intranets, and cloud computing systems. In some embodiments, the network 508 utilizes a shared network bus and implements standards that are well suited for industrial or residential applications. Some of these networking standards include communication protocols such as C-BUS™ and TCP/IP over Ethernet, serial protocols, such as MODBUS ASCII/RTU, MODBUS over Serial Line, DMX512, CAN, PC, and JCI-N2. In other examples, the network 112 utilizes a wireless bus and implements wireless protocols, such as ZigBee and Bluetooth. The network 508 may also include cellular networks such as LTE, 4G, HSDPA/HSUPA, TD-SCDMA, W-CDMA, CMDA, Wi-Fi, Bluetooth, EvDO, GSM, and iDEN networks. Although shown as a single network in FIG. 1, in some embodiments, the network 120 includes a plurality of communication networks. Thus, connections between the programmable devices 504 and 506, the management device 538, and the network 508 may include wired or wireless connections.

As also shown in FIG. 1, the programmable device 504 is coupled to and receives power for operation from the mains power 502 via the power input 510. The programmable device 504 is also coupled to and provides power for operation to the programmable device 506 via the power output 520, the power cable 532, and the power input 522. In addition, the programmable device 504 and the programmable device 506 communicate data via the power cable 532.

The programmable devices 504 and 506 are configured to independently (i.e., without instructions from a centralized control system) perform one or more configurable specialized automated functions on a periodic basis. Programmable devices, such as the programmable devices 504 and 506, have a wide range of potential applications. The characteristics of particular types of programmable devices vary depending on the function that the programmable device is configured to perform. Some specific examples of programmable devices include UPSs and PDUs.

To implement at least some of the aspects, features, and processes disclosed herein, each of the controllers 514 and 526 executes a series of instructions that result in manipulated data. The controllers 514 and 526 may include any type of processor, multiprocessor, controller, or microcontroller without departing from the scope of the embodiments disclosed herein.

As shown in FIG. 1, each of the memories 518 and 530 stores programs and data during operation of the respective programmable devices 504 and 506. Thus, the memories 518 and 530 may include any device for storing data, such as a disk drive or other non-volatile storage device, but typically include a relatively high performance, volatile, random access memory such as a dynamic random access memory (DRAM) or static memory (SRAM). Various embodiments may organize the memories 518 and 530 into particularized and, in some cases, unique structures to perform the processes disclosed herein. These data structures may be sized and organized to store values for particular data and types of data.

In some embodiments, the memories 518 and 530 include computer readable and writeable nonvolatile, or non-transitory, data storage media in which instructions are stored that define one or more programs or other objects that are executed by the controllers 514 and 526. The data storage media may, for example, include optical disk, magnetic disk or flash memory, among other forms of data storage. The instructions stored in the data storage media may be persistently stored as encoded signals, and the instructions may cause the controllers 514 and 526 to perform any of the acts or processes described herein. The memories 518 and 530 also may include information that is recorded, on or in, the data storage media, and that is processed by the controllers 514 and 526 during execution of the programs. For example, the information may include operational parameters that specify aspects the acts and processes executed by the programmable devices 504 and 506. This and other information may be stored in one or more data structures specifically configured to conserve storage space or increase data exchange performance.

As illustrated in FIG. 1, several of the components of each of the respective programmable devices 504 and 506 are coupled to corresponding interconnection elements 540 and 542. The interconnection elements 540 and 542 may include any communication coupling between components of programmable devices, such as one or more physical busses subscribing to one or more specialized or standard computing bus technologies such as IDE, SCSI, and PCI. The interconnection elements 540 and 542 enable communications, such as data and instructions, to be exchanged between components of the programmable devices 504 and 506.

Although the programmable devices 504 and 506 are shown by way of example as particular types programmable devices upon which various aspects, processes, and features may be practiced, aspects, processes, and features are not limited to being implemented on the programmable devices 504 and 506 as shown in FIG. 1. Various aspects, processes, and features may be practiced on one or more programmable devices having a different architectures or components than that shown in FIG. 1. For instance, the programmable devices 504 and 506 may include specially programmed, special-purpose hardware, such as an application-specific integrated circuit (ASIC) tailored to perform one or more particular operations disclosed herein.

The programmable devices 504 and 506 also include one or more interface devices such as input devices, output devices and combination input/output devices. Interface devices may receive input or provide output. More particularly, output devices may render information for external presentation. Input devices may accept information from external sources. Examples of interface devices include buttons, keyboards, touch screens, network interface cards, and the like. Interface devices allow the programmable devices 504 and 506 to exchange information with and to communicate with external entities, such as users and other systems.

For example, in some embodiments, the power cable interfaces 512 and 524 are configured to receive power and communicate data via a power cable, such as the power cable 532. In at least one embodiment, each of the power cable interfaces 512 and 524 includes a hardware filter to separate the mains frequency and a data communication frequency. In this embodiment, the power cable interfaces 512 and 524 each respectively provide data communicated at the data frequency to the controllers 514 and 526. The controllers 514 and 526 respectively store the communicated data in the memories 518 and 530 for subsequently processing. In addition, according to this embodiment, the power cable interface 512 is configured to inject communication signals into power output via the power output 520.

While embodiments illustrated by FIG. 1 include power cable interfaces that are distinct from network interfaces, not all embodiments are configured according to FIG. 1. For example, in at least one embodiment, the power cable interfaces are integrated with the network interfaces to provide for a unified power and network interface for each programmable device. In these embodiments, the network may be implemented, for example, according to a power over Ethernet (POE) standard. In other embodiments, the POE standard is not implemented.

In some embodiments, the controllers 514 and 526 are configured to respectively execute the cluster identifiers 534 and 536. The cluster identifiers 534 and 536, in turn, are configured to communicate with one another to automatically generate at least one power path between the programmable devices 504 and 506. When executing according to these configurations, each of the cluster identifiers 534 and 536 interacts with other components of the programmable device upon which it is executing. For example, the cluster identifier 534 stores data in the memory 518 and communicates data to the cluster identifier 536 via network interface 516 and the power cable interface 512. Similarly, the cluster identifier 536 stores data in the memory 530 and communicates data to the cluster identifier 534 via network interface 528 and the power cable interface 524. Examples of specific acts and processes executed by the cluster identifiers 534 and 536 are described further below with reference to FIGS. 3-7.

In some embodiments, the components of the programmable devices 504 and 506 disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components. For instance, in at least one embodiment, programmable device identifiers, such as those described below with reference to Table 1, are configurable parameters that may be configured by a user interface in response to input. In this embodiment, programmable devices that are unable to communicate identifiers (e.g., legacy devices) may be still be identified and recorded as belonging to a particular cluster.

Information may flow between the components illustrated in FIG. 1, or any of the elements, components and subsystems disclosed herein, using a variety of techniques. Such techniques include, for example, passing the information over a network using standard protocols, such as TCP/IP, HTTP, or HTTPS, passing the information between modules in memory and passing the information by writing to a file, database, data store, or some other nonvolatile data storage device, among others. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein. The configuration of components illustrated in FIG. 1 is provided for example purposes only. Configurations of components other than the configuration illustrated in FIG. 1 may be used to implement the features and processes disclosed herein. These components may include hardware components or a combination of hardware and software components.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers, and web servers. Other examples of computer systems may include mobile computing devices (e.g., smart phones, tablet computers, and personal digital assistants) and network equipment (e.g., load balancers, routers, and switches). Examples of particular models include iPhones, iPads, and iPod touches running iOS operating system available from Apple, Android devices like Samsung Galaxy Series, LG Nexus, and Motorola Droid X, Blackberry devices available from Blackberry Limited, and Windows Phone devices. Further, aspects may be located on a single computer system or may be distributed among a plurality of computer systems connected to one or more communications networks.

For example, various aspects, functions, and processes may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Figure 2:
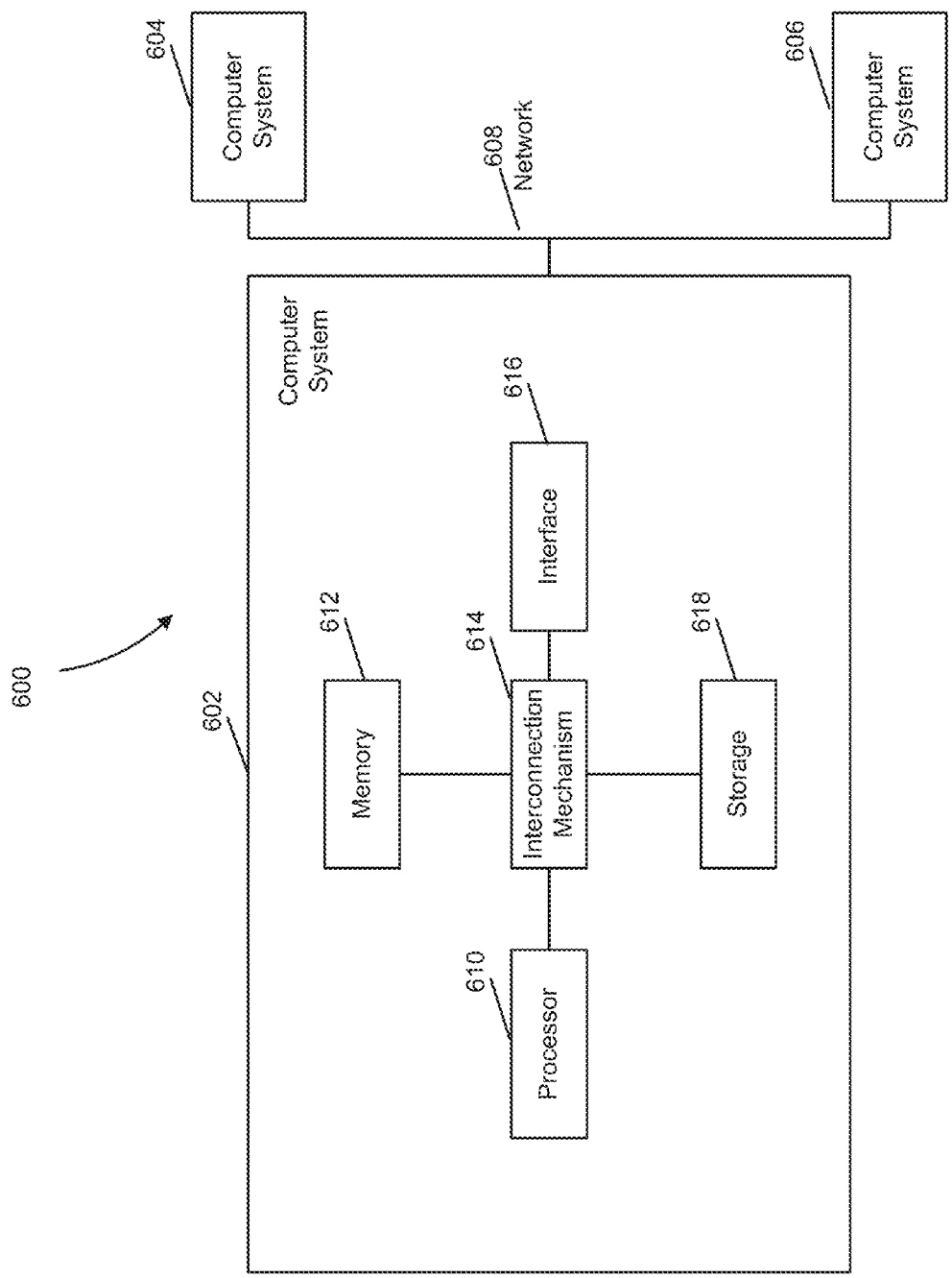
FIG. 2 is a block diagram of a computer system.

Referring to FIG. 2, there is illustrated a block diagram of a distributed computer system 600, in which various aspects and functions are practiced. As shown, the distributed computer system 600 includes one or more computer systems that exchange information. More specifically, the distributed computer system 600 includes computer systems 602, 604, and 606. As shown, the computer systems 602, 604, and 606 are interconnected by, and may exchange data through, a communication network 608. The network 608 may include any communication network through which computer systems may exchange data. To exchange data using the network 608, the computer systems 602, 604, and 606 and the network 608 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 602, 604, and 606 may transmit data via the network 608 using a variety of security measures including, for example, SSL or VPN technologies. While the distributed computer system 600 illustrates three networked computer systems, the distributed computer system 600 is not so limited and may include any number of computer systems and computing devices, networked using any medium and communication protocol.

As illustrated in FIG. 2, the computer system 602 includes a processor 610, a memory 612, an interconnection element 614, an interface 616 and data storage element 618. To implement at least some of the aspects, functions, and processes disclosed herein, the processor 610 performs a series of instructions that result in manipulated data. The processor 610 may be any type of processor, multiprocessor, or controller. Example processors may include a commercially available controller or processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 610 is connected to other system components, including one or more memory devices 612, by the interconnection element 614.

The memory 612 stores programs (e.g., sequences of instructions coded to be executable by the processor 610) and data during operation of the computer system 602. Thus, the memory 612 may be a relatively high performance, volatile, random access memory such as a dynamic random access memory ("DRAM") or static memory ("SRAM"). However, the memory 612 may include any device for storing data, such as a disk drive or other nonvolatile storage device. Various examples may organize the memory 612 into particularized and, in some cases, unique structures to perform the functions disclosed herein. These data structures may be sized and organized to store values for particular data and types of data.

Components of the computer system 602 are coupled by an interconnection element such as the interconnection element 614. The interconnection element 614 may include any communication coupling between system components such as one or more physical busses in conformance with specialized or standard computing bus technologies such as IDE, SCSI, PCI and InfiniBand. The interconnection element 614 enables communications, including instructions and data, to be exchanged between system components of the computer system 602.

The computer system 602 also includes one or more interface devices 616 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 602 to exchange information and to communicate with external entities, such as users and other systems.

The data storage element 618 includes a computer readable and writeable nonvolatile, or non-transitory, data storage medium in which instructions are stored that define a program or other object that is executed by the processor 610. The data storage element 618 also may include information that is recorded, on or in, the medium, and that is processed by the processor 610 during execution of the program. More specifically, the information may be stored in one or more data structures specifically configured to conserve storage space or increase data exchange performance. The instructions may be persistently stored as encoded signals, and the instructions may cause the processor 610 to perform any of the functions described herein. The medium may, for example, be optical disk, magnetic disk or flash memory, among others. In operation, the processor 610 or some other controller causes data to be read from the nonvolatile recording medium into another memory, such as the memory 612, that allows for faster access to the information by the processor 610 than does the storage medium included in the data storage element 618. The memory may be located in the data storage element 618 or in the memory 612, however, the processor 610 manipulates the data within the memory, and then copies the data to the storage medium associated with the data storage element 618 after processing is completed. A variety of components may manage data movement between the storage medium and other memory elements and examples are not limited to particular data management components. Further, examples are not limited to a particular memory system or data storage system.

Although the computer system 602 is shown by way of example as one type of computer system upon which various aspects and functions may be practiced, aspects and functions are not limited to being implemented on the computer system 602 as shown in FIG. 2. Various aspects and functions may be practiced on one or more computers having a different architectures or components than that shown in FIG. 2. For instance, the computer system 602 may include specially programmed, special-purpose hardware, such as an application-specific integrated circuit ("ASIC") tailored to perform a particular operation disclosed herein. While another example may perform the same operation using a grid of several general-purpose computing devices running MAC OS System X with Intel processors and several specialized computing devices running proprietary hardware and operating systems.

The computer system 602 may be a computer system including an operating system that manages at least a portion of the hardware elements included in the computer system 602. In some examples, a processor or controller, such as the processor 610, executes an operating system. Examples of a particular operating system that may be executed include a Windows-based operating system, such as, Windows NT, Windows 2000 (Windows ME), Windows XP, Windows Vista, Windows Phone, or Windows 7 operating systems, available from the Microsoft Corporation, Android operating system available from Google, Blackberry operating system available from Blackberry Limited, a MAC OS System X operating system or an iOS operating system available from Apple, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 610 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, Ruby, Objective-C, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Automatic Clustering Processes

Figure 3:
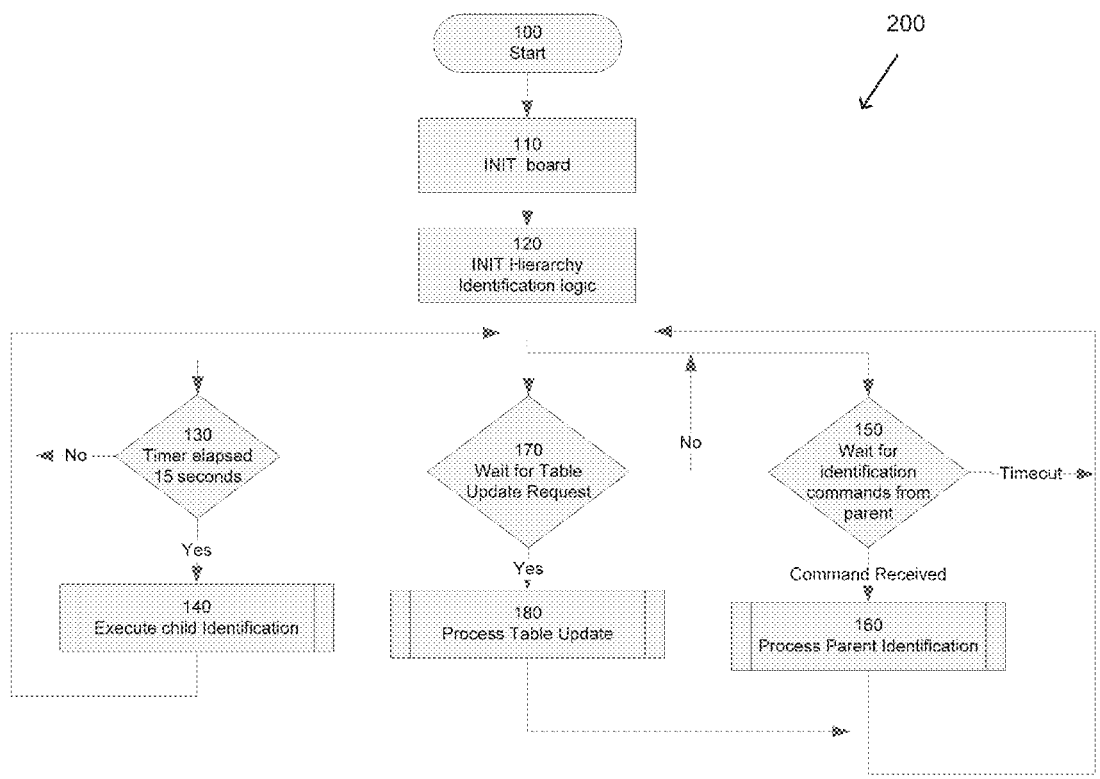
FIG. 3 is a flow diagram illustrating an automatic clustering process.

As described above with reference to FIG. 1, some embodiments include programmable devices that execute automatic clustering processes. In some embodiments, these automatic clustering processes are executed at boot of the programmable device and continuously execute until the programmable device is shutdown. A wide variety of programmable devices may execute these processes including, for example, the programmable devices 504 and 506 described above with reference to FIG. 1. FIG. 3 illustrates an example automatic clustering process 200 in accord with the embodiments disclosed herein. The automatic clustering process 200 begins at 100.

In act 110, a programmable device executing the automatic clustering process 200 initializes its peripherals, hardware, and stacks. In act 120, the programmable device initializes a cluster identifier, such as the cluster identifier 534 described above with reference to FIG. 1. Also, with in the act 120, the cluster identifier executes a test of the programmable device's hardware and initializes a timer. In act 130, the cluster identifier determines whether a first timer has expired. The first timer may be configured to expire according to a variety of schedules (e.g., every 15 seconds). In response to expiration of a first timer (e.g., every 15 seconds), the cluster identifier executes act 140 in an attempt to identify child devices by executing a client identification process, such as the child identification process 400 described below with reference to FIG. 4.

In act 150, a cluster identifier, such as the cluster identifier 536 described above with reference to FIG. 1, determines whether it has received a parent identification message from a parent programmable device. If so, in act 160, the cluster identifier responds by executing a parent identification process, such as the parent identification process 600 described below with reference to FIG. 5.

In act 170, the cluster identifier determines whether it has received a table update message. If so, in act 180, the cluster identifier responds by executing a table update process, such as the table update process 700 described below with reference to FIG. 6.

Execution of the automatic clustering process 100 terminates when the programmable device terminates execution of the cluster identifier. Processes in accord with the automatic clustering process 100 enable programmable devices to automatically discover children and parent devices within their power path in an automatic and reliable manner. The programmable devices may, in turn, transmit this power path information to a management device to support a variety of management, control, maintenance, and identification functions.

Figure 4:
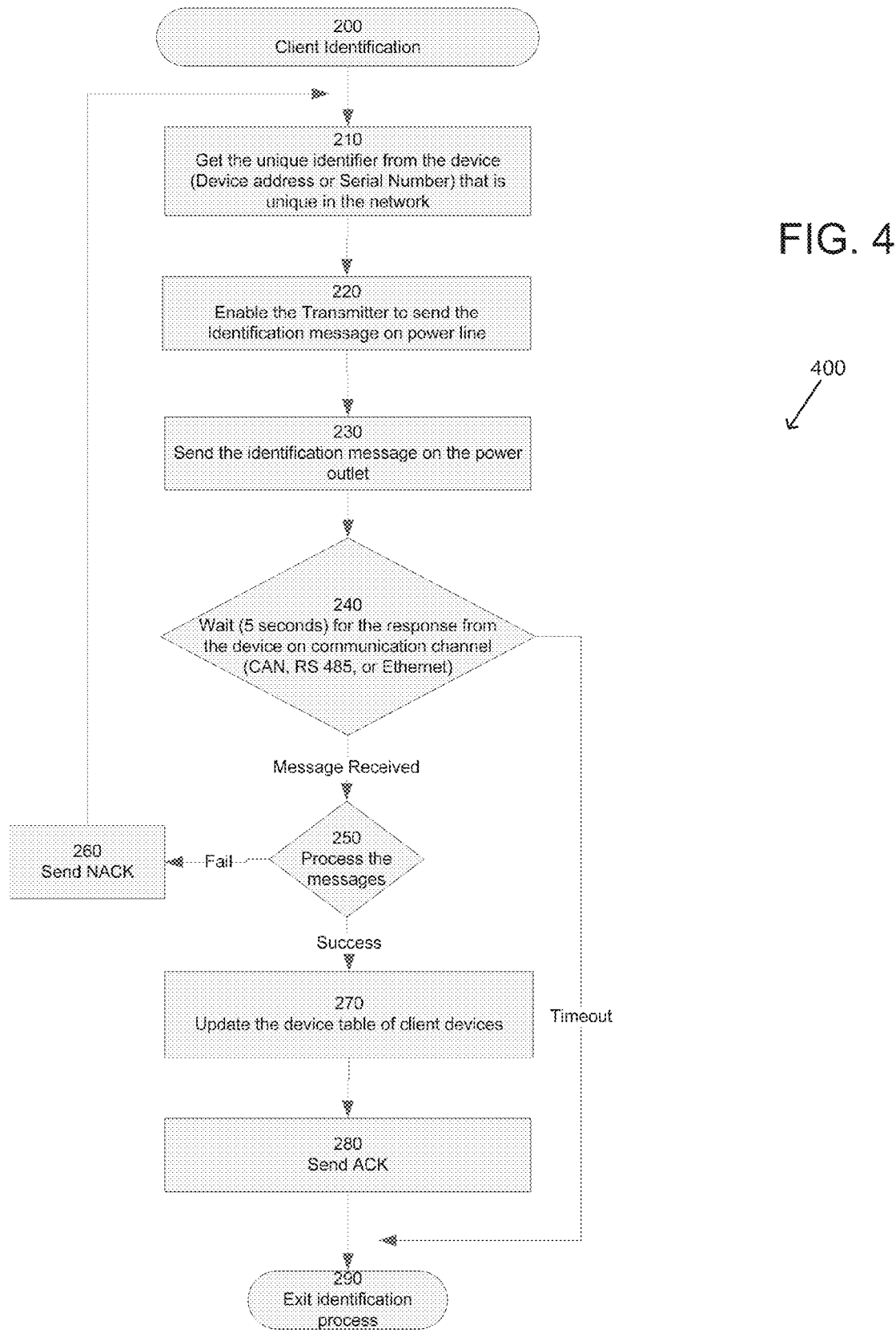
FIG. 4 is a flow diagram illustrating a client identification process.

As described above with reference to FIG. 3, according to some embodiments, a cluster identifier, such as the cluster identifier 534 described above with reference to FIG. 1, executes child identification processes. FIG. 4 illustrates a child identification process 400 in accord with the embodiments disclosed herein. The child identification process 400 begins at 200.

In act 210, the cluster identifier determines an identifier that uniquely identifies the programmable device on a network, such as the network 508 described above with reference to FIG. 1. Examples of identifiers used in some embodiments include serial numbers and network addresses.

In act 220, the cluster identifier encodes an IDENT message to include the identifier of the programmable device and transmits a request to a power cable interface, such as the power cable interface 512, to prepare to transmit information via a power cable, such as the power cable 532 described above with reference to FIG. 1. In act 230, the cluster identifier transmits another request to the power cable interface to transmit the IDENT message via the power cable.

In act 240, the cluster identifier monitors a network interface, such as the network interface 516 described above with reference to FIG. 1, to determine whether it has received one or more responses to the IDENT message within a timeout period (e.g., 5 seconds) specified by a configurable parameter. If not, the cluster identifier proceeds to act 290. Otherwise, the cluster identifier parses the one or more response and determines whether this parsing activity was successful in act 250. The information parsed from the response may include a unique identifier of a child programmable device, a network supported by the child programmable device, and an identifier of the child programmable device on the supported network. If the parsing activity was not successful, in act 260 the cluster identifier transmits a NACK to the one or more child programmable devices that transmitted the one or more responses and returns to the act 210.

In act 270, the cluster identifier records an association between the parent programmable device executing the cluster identifier and the child programmable device that transmitted the response. Table 1 illustrates one example of a device table that is maintained to record these parent-child associations according to one embodiment.

TABLE 1

Sample Device Table

| Device ID | Protocol | Address |
| --- | --- | --- |
| AP0124 | ECPe | 32 |
| AP0124:AD5460 | ECPe | 54 |
| AP0124:CA3340 | Ethernet | 10.179.132.22 |
| AP0124:AC1111 | RS4B5 | 10 |
| AP0124:AD5460:CD0102 | ECPe | 22 |

Figure 7:
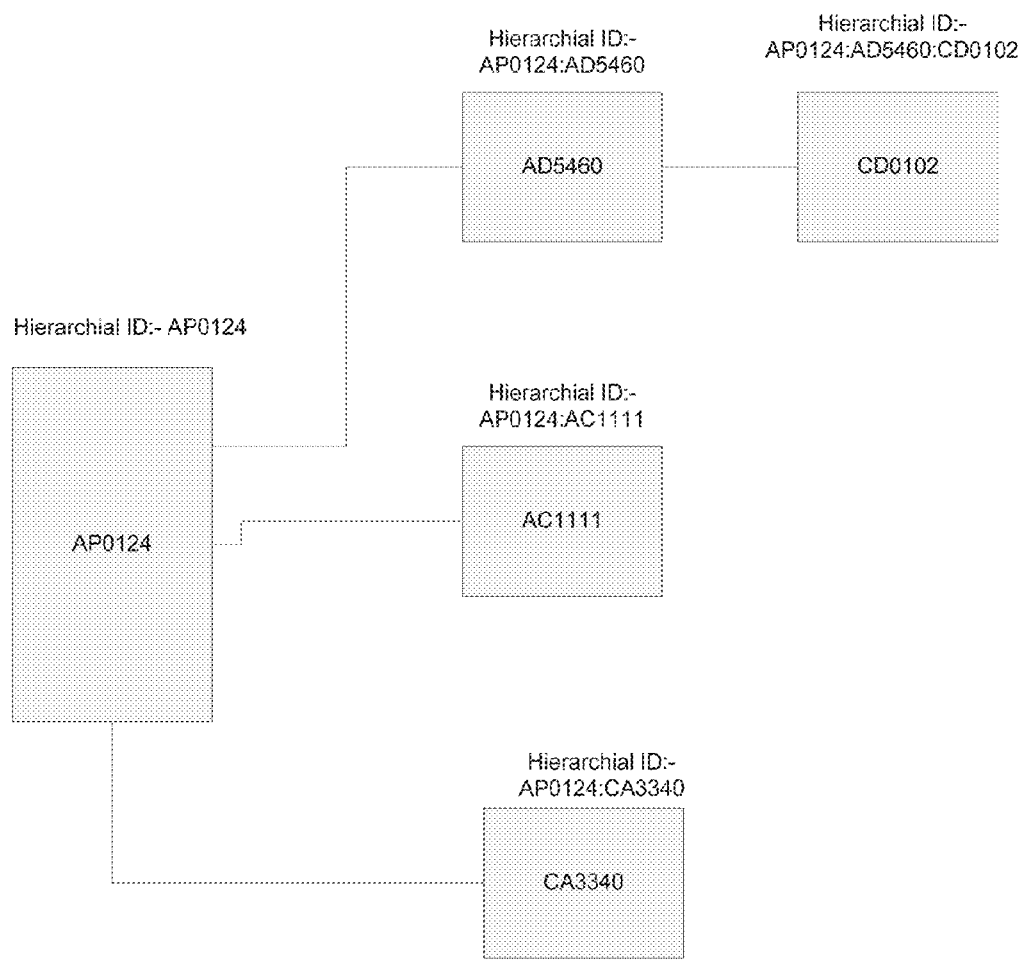
FIG. 7 is a block diagram illustrating an example of a cluster of programmable devices.

More specifically, Table 1 lists parent-child associations between a parent device uniquely identified as APO124 and 4 child devices uniquely identified by the following identifiers: AD5460, CA3340, AC1111, and CD0102. In this example, the child device identified as AD5460 is also a parent device of the child device identified as CD0102. Table 1 also includes information indicating a network protocol supported by the child device and an address of the child device on the supported network. FIG. 7 illustrates a power hierarchy that corresponds to the association information recorded in Table 1.

In act 280, the cluster identifier transmits an ACK the one or more child programmable devices that transmitted the one or more responses. In act 290, the cluster identifier exits the child identification process 400.

Processes in accord with the child identification process 400 enable programmable devices to determine whether one or more child programmable devices depend on the programmable device for operating power.

Figure 5:
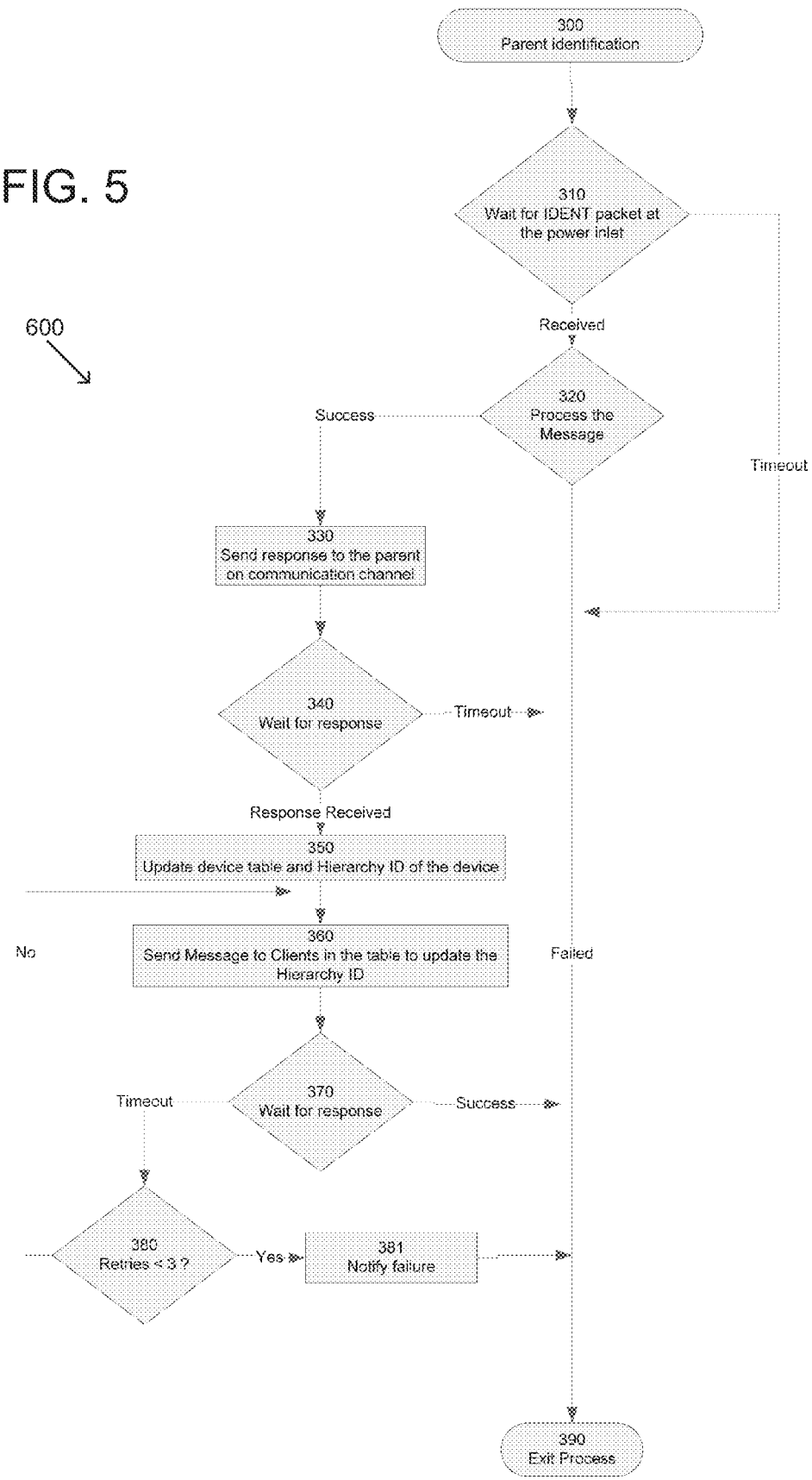
FIG. 5 is a flow diagram illustrating a parent identification process.

As described above with reference to FIG. 3, according to some embodiments, a cluster identifier, such as the cluster identifier 536 described above with reference to FIG. 1, executes parent identification processes. FIG. 5 illustrates a parent identification process 600 in accord with the embodiments disclosed herein. The child identification process 600 begins at 300.

In act 310, the cluster identifier monitors a power cable interface, such as the power cable interface 524 to determine whether an IDENT message has been received at a power input, such as the power input 522 described above with reference to FIG. 1, within a timeout period (e.g., 5 seconds) specified by a configurable parameter. If not, the cluster identifier proceeds to act 390. Otherwise, the cluster identifier parses the IDENT message and determines whether this parsing activity was successful in act 320. If the parsing activity was not successful, the cluster identifier proceeds to the act 390. Otherwise, the cluster identifier transmits a response to the IDENT message on a network, such as the network 508 described above with reference to FIG. 1, via a network interface, such as the network interface 528.

In act 340, the cluster identifier monitors the network interface to determine whether it has received an ACK from a parent programmable device within a timeout period (e.g., 5 seconds) specified by a configurable parameter. If not, the cluster identifier proceeds to act 390. Otherwise, in act 350 the cluster identifier parses the ACK and updates the associations (e.g., device table) stored in the programmable device with the parent programmable device's information. This information may include a unique identifier of a parent programmable device, a network supported by the parent programmable device, and an identifier of the parent programmable device on the supported network.

In act 360, the cluster identifier transmits a message, via the network interface, to each of its child programmable devices requesting that each child update its associations (e.g., device table) with parent programmable device information. In act 370, the cluster identifier monitors the network interface to determine whether it has received an ACK from its one or more child programmable devices within a timeout period (e.g., 5 seconds) specified by a configurable parameter. If so, the cluster identifier proceeds to act 390. Otherwise, the cluster identifier determines whether it has returned to the act 360 for a maximum number of iterations (e.g., 3 iterations) specified by a configurable parameter. If not, the cluster identifier returns to the act 360. Otherwise, in act 381 the cluster identifier transmits a failure message to an entity specified by a configurable parameter (e.g., the management device 538 described above with reference to FIG. 1).

In act 390, the cluster identifier exits the parent identification process 600. Processes in accord with the parent identification process 600 enable programmable devices to determine whether they have one or more parent programmable devices upon which they depend for operating power.

Figure 6:
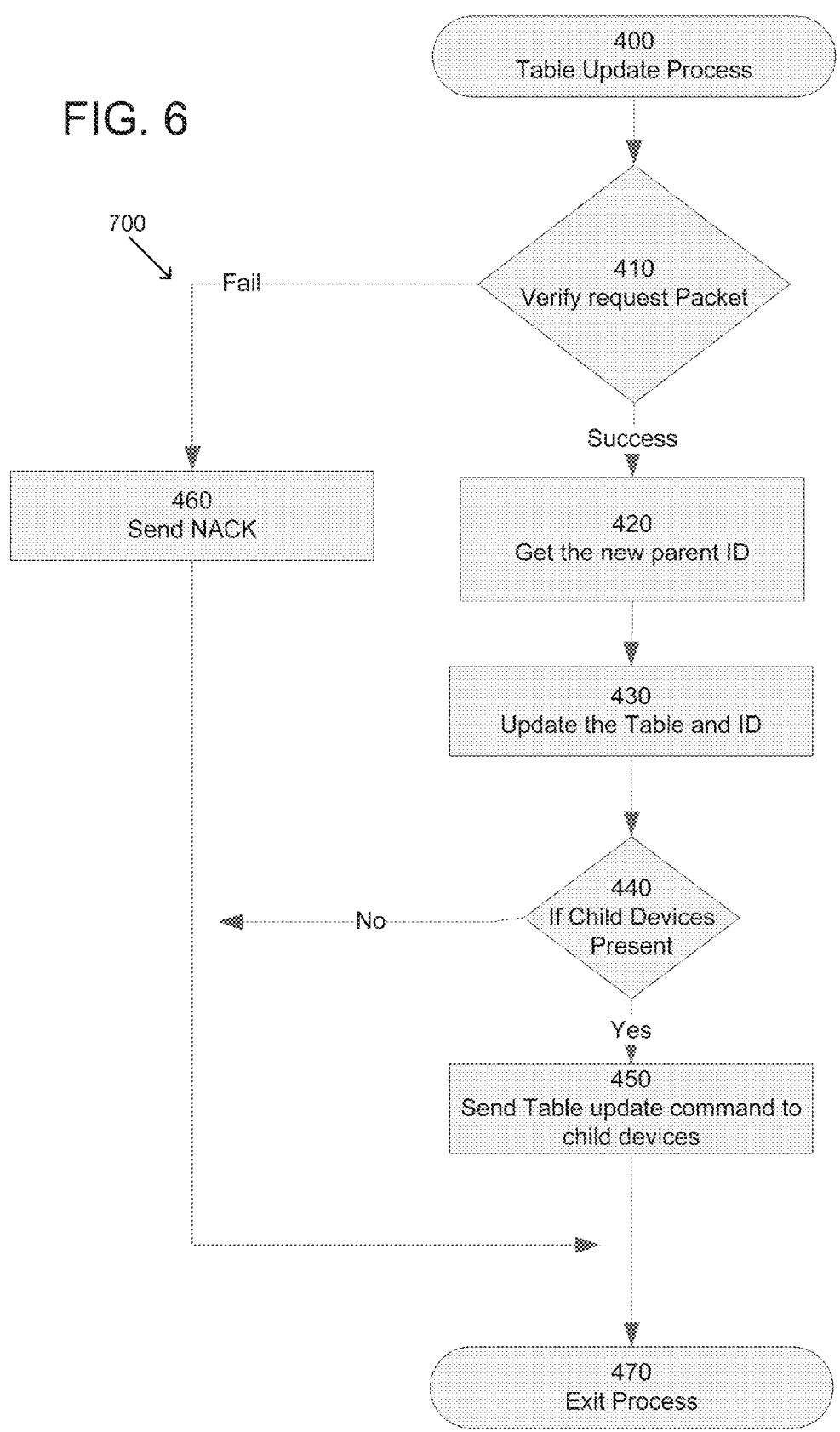
FIG. 6 is a flow diagram illustrating a table update process.

As described above with reference to FIG. 3, according to some embodiments, a cluster identifier, such as the cluster identifier 536 described above with reference to FIG. 1, executes table update processes. FIG. 6 illustrates a table update process 700 in accord with the embodiments disclosed herein. The table update process 700 begins at 400.

In act 410, the cluster identifier parses the update message and determines whether this parsing activity was successful in act 410. If the parsing activity was not successful, the cluster identifier proceeds to act 460. Otherwise, the cluster identifier proceeds to the act 420.

In the act 460, the cluster identifier transmits a NACK to the programmable device that transmitted the update message. In the act 420, the cluster identifier retrieves information descriptive of the parent programmable device (e.g., identifier, supported network, network identifier) from the update message. In the act 430, the cluster identifier updates the associations (e.g., device table) stored in the programmable device with the parent programmable device's information.

In act 440, the cluster identifier determines whether the programmable device has any child programmable devices. If not, the cluster identifier proceeds to the act 470. Otherwise, the programmable device transmits update messages to each child programmable device in act 450.

In act 470, the cluster identifier exits the table update process 700. Processes in accord with the table update process 700 enable programmable devices to request that other programmable devices within their power path update their power path information, thereby helping to maintain the currency of power path information.

Processes 200, 400, 600, and 700 each depict one particular sequence of acts in a particular embodiment. The acts included in these processes may be performed by, or using, one or more programmable devices or computer systems specially configured as discussed herein. Some acts are optional and, as such, may be omitted in accord with one or more embodiments. Additionally, the order of acts can be altered, or other acts can be added, without departing from the scope of the embodiments described herein. Furthermore, as described above, in at least one embodiment, the acts are performed on particular, specially configured machines, namely a programmable device configured according to the examples and embodiments disclosed herein.

Having thus described several aspects of at least one example, it is to be appreciated that various alterations, modifications, and improvements will readily occur to those skilled in the art. For instance, examples and embodiments disclosed herein may also be used in other contexts. These contexts include power management systems, datacenters, and smart grid systems. Such alterations, modifications, and improvements are intended to be part of this disclosure, and are intended to be within the scope of the examples discussed herein. Accordingly, the foregoing description and drawings are by way of example only.

What is claimed is:

1. A computer implemented method comprising:
   determining an identifier of a parent device;
   providing output power along a power path to a child device via a power output of the parent device;
   transmitting an identification message to the child device via the power output of the parent device, the identification message including the identifier of the parent device;
   receiving a response to the identification message from the child device via a first network interface of the parent device distinct from the power output, the response including an identifier of the child device; and
   generating a power connection hierarchy based on the power path between at least the parent device and the child device and based on the identifier of the child device.

2. The method of claim 1, wherein determining the identifier of the parent device includes receiving input indicating the identifier of the parent device.

3. The method of claim 1, wherein receiving the response includes receiving the response to the identification message via the first network interface communicatively coupled to the child device to receive data from the child device using a communication protocol comprising at least one of CAN, MODBUS, and Ethernet.

4. The method of claim 1, further comprising:
   determining the identifier of the child device;
   receiving the identification message via a power input of the child device; and
   transmitting the response via a second network interface of the child device.

5. The method of claim 4, further comprising:
   updating a parent device table with the identifier of the parent device and the identifier of the child device; and
   transmitting a first table update message to the child device, the first table update message comprising the identifier of the parent device and the identifier of the child device.

6. The method of claim 5, further comprising:
   receiving the first table update message at the child device;
   updating a child device table with the identifier of the parent device and the identifier of the child device; and
   transmitting a second table update message to another child device, the second table update message comprising the identifier of the parent device and the identifier of the child device.

7. A system including a parent device, the parent device comprising:
   a power output configured to provide output power along a power path to a child device;
   a first network interface configured to exchange data with at least the child device, wherein the first network interface is distinct from the power output; and
   at least one controller coupled to the power output and the first network interface and configured to:
   determine an identifier of the parent device;
   transmit an identification message to the child device via the power output, the identification message including the identifier of the parent device;
   receive a response to the identification message via the first network interface, the response including an identifier of the child device; and
   generate a power connection hierarchy based on the power path between at least the parent device and the child device and based on the identifier of the child device.

8. The system of claim 7, further comprising a graphical user interface coupled to the at least one controller and configured to receive input indicating the identifier of the parent device.

9. The system of claim 7, wherein the at least one controller is further configured to:
   update a parent device table with the identifier of the parent device and the identifier of the child device; and
   transmit a first table update message to the child device, the first table update message including the identifier of the parent device and the identifier of the child device.

10. The system of claim 9, further comprising the child device, the child device including:
    a power input configured to receive power;
    a second network interface configured to exchange data with one or more external devices; and
    one or more controllers coupled to the power input and the second network interface and configured to:
    determine an identifier of the child device;
    receive the identification message via the power input; and
    transmit the response via the second network interface.

11. The system of claim 10, wherein the one or more controllers of the child device are further configured to:
    receive the first table update message;
    update a child device table with the identifier of the parent device and the identifier of the child device; and
    transmit a second table update message to another child device, the second table update message comprising the identifier of the parent device and the identifier of the child device.

12. The system of claim 10, wherein the first network interface is communicatively coupled to the child device to receive data from the child device using a communication protocol comprising at least one of CAN, MODBUS, and Ethernet.

13. A system including a child device, the child device comprising:
  a power cable interface configured to receive power from a parent device along a power path and provide the power received from the parent device to another child device;
  a first network interface configured to exchange data with at least the parent device, wherein the first network interface is distinct from the power input; and
  at least one controller coupled to the power input and the first network interface and configured to:
    determine an identifier of the child device;
    receive an identification message from the parent device via the power input, the identification message including the identifier of the parent device; and
    transmit a response to the identification message via the first network interface, the response including an identifier of the child device.

14. The system of claim 13, further comprising a graphical user interface coupled to the at least one controller and configured to receive input indicating the identifier of the child device.

15. The system of claim 13, wherein the at least one controller is further configured to:
  receive a first table update message from the parent device, the first table update message including the identifier of the child device and the identifier of the parent device;
  update a child device table with the identifier of the child device and the identifier of the parent device; and
  transmit a second table update message to the another child device, the second table update message comprising the identifier of the parent device and the identifier of the child device.

16. The system of claim 15, further comprising the parent device, the parent device including:
  a power output configured to provide output power to an external device;
  a second network interface configured to exchange data with one or more external devices; and
  one or more controllers coupled to the power output and the second network interface and configured to:
    determine an identifier of the parent device;
    transmit the identification message via the power output; and
    receive the response via the second network interface.

17. The system of claim 16, wherein the one or more controllers of the parent device are further configured to:
  update a parent device table with the identifier of the parent device and the identifier of the child device; and
  transmit the first table update message.

* * * * *